United States Patent [19]

Culbreth

[11] Patent Number: 4,553,014

[45] Date of Patent: Nov. 12, 1985

[54] SELF-SEALING ELECTRODE GUIDE

[75] Inventor: Thomas F. Culbreth, Columbia, S.C.

[73] Assignee: Westinghouse Electric Corp., Pittsburgh, Pa.

[21] Appl. No.: 588,611

[22] Filed: Mar. 12, 1984

[51] Int. Cl.$^4$ .................. B23K 9/28; H01B 17/30; F16J 15/48

[52] U.S. Cl. .................................... 219/75; 174/18; 174/152 R; 219/136; 219/138; 277/4; 277/12; 277/27

[58] Field of Search ............... 219/75, 136, 72, 137.2, 219/137.44, 138, 144; 174/18, 65 SS, 151, 152 R; 277/4, 12, 27, 110, 112, DIG. 8; 314/112; 373/68, 69, 77, 95, 100; 403/31; 279/1 Q, 102

[56] References Cited

U.S. PATENT DOCUMENTS 2,422,379  6/1947  Westman .................. 174/152 R
2,426,200  8/1947  Green ......................... 279/102 R

FOREIGN PATENT DOCUMENTS 926189  5/1963  United Kingdom .............. 174/18

Primary Examiner—Laramie E. Askin
Attorney, Agent, or Firm—D. E. Erickson

[57] ABSTRACT

A self-sealing electrode guide for supporting an electrode in an electrode port of a welding chamber, includes a housing adapted to be mounted in the electrode port and a sealing sleeve accommodated in a housing channel defined in the housing. The sealing sleeve has opposite first and second ends and an open-ended passage adapted to receive the electrode. The first end is disposed for exposure to an external force which is oriented in a direction extending from the first end towards the second end and which is derived from a pressure in the welding chamber. An abutting arrangement is provided in the housing for cooperating with the second end to prevent displacement of the sealing sleeve relative to the housing. The sealing sleeve is resiliently deformable by the external force for assuming a deformed state in which the sealing sleeve is sealingly pressed about the electrode and against housing walls forming the housing channel.

5 Claims, 2 Drawing Figures

SELF-SEALING ELECTRODE GUIDE

STATEMENT OF GOVERNMENT INTEREST

This invention was not conceived or reduced to practice in the performance of any contract with the U.S. government.

BACKGROUND OF THE INVENTION

1. Field of the Invention

This invention relates to an electrode guide, particularly for supporting a welding electrode traversing the wall of a welding chamber in which tungsten inert gas (TIG) welding is performed at a gas pressure ranging between approximately 7 to 50 kg/cm$^2$.

2. Description of the Prior Art

In order to provide the required gastight seal at the electrode port of the pressurized welding chamber, conventionally fittings on the electrode guide have to be tightened or high frictional forces have to be overcome during the introduction of the electrode into the guide. Either measure has rendered the sealing of the electrode port circumstantial, particularly in view of the fact that the electrode, being a consumable item, has to be periodically displaced relative to the electrode guide, for purposes of replacement or reconditioning.

SUMMARY OF THE INVENTION

It is an object of the invention to provide an improved electrode guide which automatically provides a gastight seal of the electrode port in response to the pressurization of the welding chamber.

This object and others to become apparent as the specification progresses, are accomplished by the invention, according to which, briefly stated, the electrode guide comprises a rigid housing channel closely surrounding a resilient compressible sealing sleeve having an open-ended axial passage through which an electrode passes. When not is operation, the sealing sleeve is in a substantially unstressed state allowing an easy longitudinal displacement of the electrode with respect thereto. The electrode guide is, together with the electrode, installed in the welding chamber wall, and one end face of the sealing sleeve is, at least indirectly, exposed to the gas pressure in the welding chamber. The pressure generated in the welding chamber exerts an axial compressing force on the sealing sleeve. By rigidly supporting the opposite end of the sealing sleeve as well as its entire outer circumferential surface, the compressing force causes a radially inwardly directed deformation of the sealing sleeve, whereby its axial passage which accommodates the electrode, constricts radially and thus presses circumferentially against the electrode, providing a reliable seal thereabout. The sealing sleeve also seeks to deform radially outwardly, whereby it is firmly and sealingly pressed against the wall of the housing channel.

DESCRIPTION OF THE PREFERRED EMBODIMENT

Figures 1, 2:
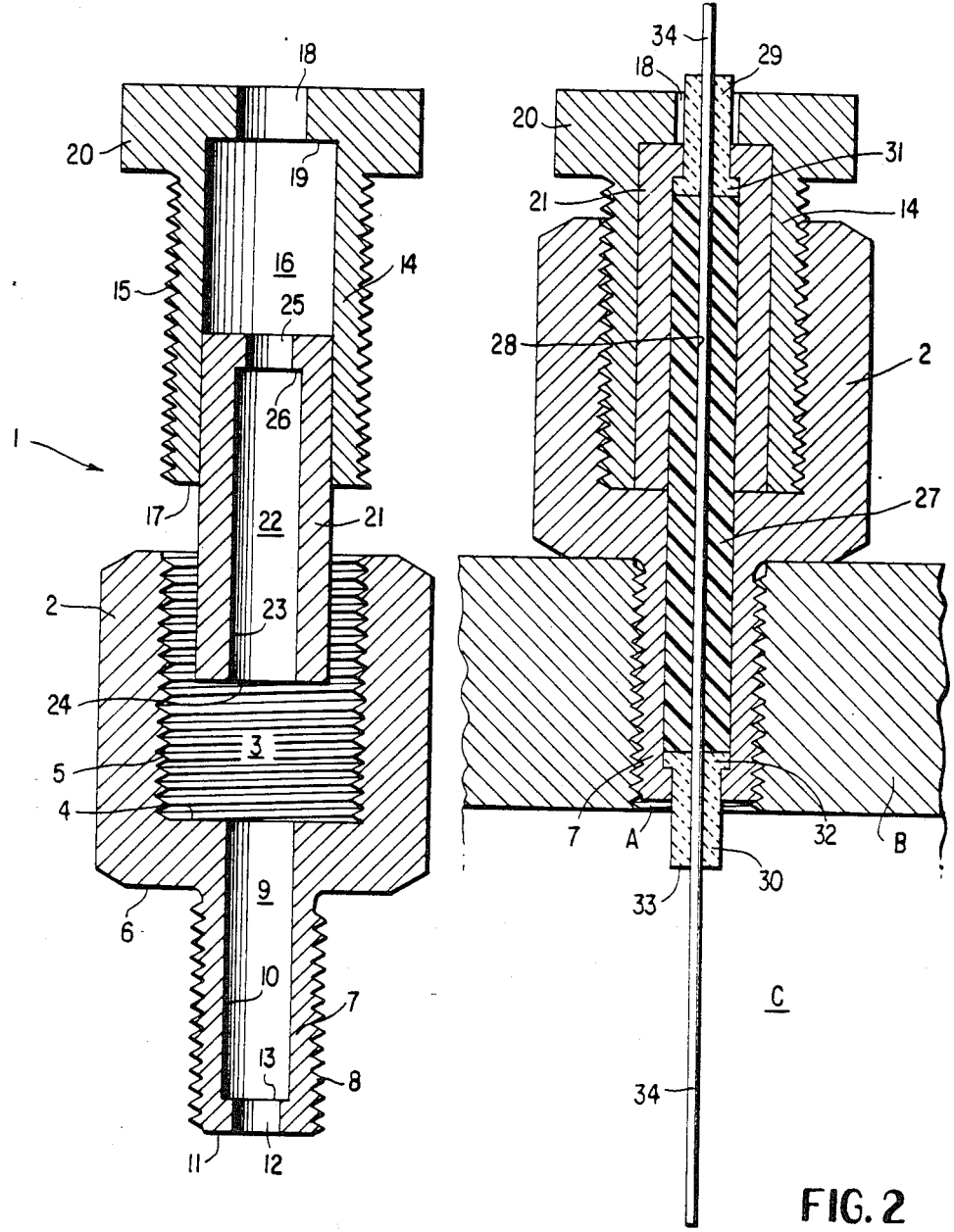
FIG. 1 is an axial sectional view of several components of a preferred embodiment of the invention, shown in an axially slightly separated state.
FIG. 2 is an axial sectional view of the preferred embodiment in the fully assembled and installed state.

Turning now to FIG. 1, there is shown an electrode guide housing generally indicated at 1, having a first, a second and a third housing part, illustrated in an axially slightly separated state for clarity.

The first housing part 2 has a generally cup-shaped body defining an axial cylindrical cavity 3 bounded by a radial base 4 and an inner cylindrical wall provided with a thread 5. A radial underside 6 of the housing part 2 is joined by an axial extension or screw portion 7 provided with an external thread 8. From the base 4 of the housing part 2 there extends, essentially within the screw portion 7, an axial channel 9 defined by an inner axial cylindrical wall 10. At a short distance from the free end 11 of the screw portion 7 the axial channel 9 is stepped to continue, to the free end 11, as an outwardly open axial port 12. The junction between the channel 9 and the port 12 defines a radially inwardly oriented shoulder 13. The first housing part 2 may have a rectangular or hexagonal outline for engagement by a tightening tool.

The second housing part 14 is, in essence, a screw cap having a cylindrical body provided with an external thread 15 matching the internal thread 5 of the first housing part 2. The screw cap 14 has an axial cavity 16 which is open at the end 17 of the screw cap 14 and which, at the opposite end, is stepped to continue in an outwardly open axial port 18. The junction between the cavity 16 and the port 18 defines a radially inwardly extending base 19 of the screw cap 14. Opposite the end 17, the screw cap 14 is provided with an enlargement or head 20 which may be of hexagonal or square shape to receive a tightening tool.

The third housing part 21 is a support sleeve which fits slidably into the cylindrical cavity 16 of the screw cap 14 and whose axial length equals that of the cavity 16. The support sleeve 21 has an axial channel 22 formed by a cylindrical inner wall 23. The axial channel 22 has a diameter equalling that of the axial channel 9 of the first housing part 2 and is open at the end 24. At the opposite end the axial channel 22 is stepped and continues as an outwardly open axial port 25. The junction between the axial channel 22 and the axial port 25 defines an inwardly oriented annular radial shoulder 26.

The first, second and third housing parts 2, 14 and 21 may be, for example, of stainless steel.

Also turning now to FIG. 2, the three housing parts 2, 14 and 21 are shown in an assembled (screwed-together) state.

In a housing channel constituted by the axially aligned channels 9 and 22 of the respective housing parts 2 and 21 there is disposed, in a close fit, a resiliently readily deformable, electrically insulating sealing sleeve 27 which may be of neoprene or urethane and may have an indentation hardness of about 50 on the scale of a Shore "A" Durometer. The sealing sleeve 27 has an axial passage 28 open at both sleeve ends. As seen in FIG. 2, in the assembled state of the housing, the screw cap 14 is, with its end 17, tightened against the base 4 of the housing part 2 and the support sleeve 21 is axially immobilized between the bases 4 and 19 of the parts 2 and 14, respectively.

The sealing sleeve 27 is engaged at both ends by respective, electrically insulating plugs 29 and 30 each having an open-ended axial passage which is in alignment with the axial passage 28 of the sealing sleeve 27.

The plug 29 has a head 31 seated against the annular shoulder 26 of the support sleeve 21. The plug 29 axially projects through the port 25 of the support sleeve 21 and extends outwardly beyond the port 18 of the head 20 which forms part of the screw cap 14. The plug 30, in turn, has a head 32 which is seated against the annular shoulder 13 of the first housing part 2. The plug 30 extends through the port 12 of the housing part 2 and terminates in a radial end face 33 oriented away from the sealing sleeve 27. The diameters of the cylindrical wall 10 and the port 12 in the housing part 2, on the one hand and the diameters of the plug 30, on the other hand, are so coordinated that an axial displacement of the plug 30 within the axial channel 9 and the port 12 is not interfered with by frictional contact between the plug 30 and the walls of the channel 9 or the port 12. The plugs 29 and 30 are substantially rigid as compared to the sealing sleeve 27 and may be of Bakelite or a ceramic material.

The assembled electrode guide is, by means of the thread 8 of the screw portion 7, screwed into an electrode part A of a welding chamber B and tightened to the chamber wall thereof. The plug 30 extends into the inside C of the welding chamber A, not shown in further detail.

An electrode 34 is, prior or subsequent to mounting of the housing part 2 on the welding chamber B, introduced into the continuous axial passage formed by the passages in the plugs 29 and 30 as well as the sealing sleeve 27. The diametral dimensions of the axial passage 28 of the sealing sleeve 27 and the electrode 34 are so coordinated that in the unstressed state of the sealing sleeve 27, the electrode 34 may be axially easily displaced with respect to the sealing sleeve 27 and the plugs 29 and 30.

Upon pressurization of the inside C of the welding chamber A, particularly for performing a tungsten inert gas (TIG) welding therein, the pressure, which is generally in a range of between 7 and 50 kg/cm$^2$, exerts an axial force on the radial face 33 of the plug 30, pressing the latter against the sealing sleeve 27. Since the sealing sleeve 27 is unyieldingly supported at its other radial end by the plug 29 abutting an end of the sleeve 27 and by the surrounding housing channel 9, 22, an axial compression of the sealing sleeve 27 will result in a radially inwardly oriented deformation thereof, whereby the axial passage 28 is constricted and thus circumferentially clamps about the electrode 34 forming a seal in cooperation therewith. Further, the sealing sleeve 27 also seeks to deform radially outwardly, whereby it is firmly and sealingly pressed against the rigid walls 10 and 23 of the housing channel 9, 22. The sealing force automatically adjusts itself dependent upon the magnitude of the gas pressure within the welding chamber. Upon depressurization of the welding chamber, the sealing sleeve 27, by its inherent resiliency, regains its non-deformed condition allowing once again an easy longitudinal displacement of the electrode 34.

Exemplary approximate dimensions of the sealing sleeve 27 may be as follows:
Axial length: 25 mm.
Outer diameter: 9 mm.
Diameter of the axial passage 28: 4 mm.

It will be understood that the above description of the present invention is susceptible to various modifications, changes and adaptations, and the same are intended to be comprehended within the meaning and range of equivalents of the appended claims.

I claim:
1. Welding apparatus comprising:
a welding chamber having an electrode port, a generally constant diameter electrode, and a self-sealing electrode guide for supporting said electrode in said electrode port of said welding chamber, said electrode guide including a housing adapted to be mounted in the electrode port, said housing including housing walls defining a housing channel; a sealing sleeve accommodated in said housing channel; said sealing sleeve having opposite first and second ends and a passage extending within said sealing sleeve and being open at said first and second ends; said passage being adapted to receive the electrode; said first end being disposed for exposure to an external force oriented in a direction extending from said first end towards said second end; said force being derived from a pressure in the welding chamber; and abutting means held in said housing and cooperating with said second end for preventing displacement of said sealing sleeve in said direction relative to said housing; said sealing sleeve being resiliently deformable by said external force for assuming a deformed state in which said sealing sleeve is sealingly pressed about the electrode and against said housing walls; and said electrode and said passage of said sealing sleeve having diametral dimensions such that said electrode is axially displaceable with respect to said sealing sleeve in the absence of said external force.

2. Welding apparatus as defined in claim 1, further comprising a plug slidably disposed in said housing channel and being in engagement with said first end of said sealing sleeve; said plug having an end face oriented away from said sealing sleeve; said end face, in a mounted state of the housing in the electrode port, is exposed to the pressure in the welding chamber and transmits said force to said sealing sleeve.

3. Welding apparatus as defined in claim 2, wherein said plug projects beyond said housing and has a throughgoing passage for the electrode.

4. Welding apparatus as defined in claim 1, wherein said abutting means comprises a plug arranged in a face-to-face relationship with said second end of said sealing sleeve.

5. Welding apparatus as defined in claim 4, wherein said plug projects beyond said housing and has a throughgoing passage for the electrode.

* * * * *